United States Patent
Lau

(10) Patent No.: US 9,560,694 B2
(45) Date of Patent: Jan. 31, 2017

(54) CACHE-INDUCED OPPORTUNISTIC MIMO COOPERATION FOR WIRELESS NETWORKS

(71) Applicant: The Hong Kong University of Science and Technology, Hong Kong (HK)

(72) Inventor: Vincent Kin Nang Lau, New Territories (HK)

(73) Assignee: The Hong Kong University of Science and Technology, Kowloon (HK)

( * ) Notice: Subject to any disclaimer, the term of this patent is extended or adjusted under 35 U.S.C. 154(b) by 0 days.

(21) Appl. No.: 13/975,037

(22) Filed: Aug. 23, 2013

(65) Prior Publication Data

US 2014/0201311 A1    Jul. 17, 2014

Related U.S. Application Data

(60) Provisional application No. 61/849,000, filed on Jan. 17, 2013.

(51) Int. Cl.
*H04W 88/08* (2009.01)

(52) U.S. Cl.
CPC .................... *H04W 88/08* (2013.01)

(58) Field of Classification Search
CPC .............. H04L 29/08072; H04L 29/08081
USPC ........................................... 709/213
See application file for complete search history.

(56) References Cited

U.S. PATENT DOCUMENTS

| | | | |
|---|---|---|---|
| 7,117,262 B2 | 10/2006 | Bai et al. | |
| 8,108,620 B2 | 1/2012 | Anderson et al. | |
| 8,285,291 B2 * | 10/2012 | Dinan | H04W 36/26 370/331 |
| 9,338,726 B2 * | 5/2016 | Krishnaswamy | H04W 40/10 |
| 2005/0193131 A1 * | 9/2005 | Bai et al. | 709/229 |
| 2009/0135944 A1 | 5/2009 | Dyer et al. | |
| 2010/0111018 A1 * | 5/2010 | Chang | H04B 7/15585 370/329 |
| 2011/0317585 A1 * | 12/2011 | Moon et al. | 370/254 |
| 2012/0110113 A1 | 5/2012 | Lee et al. | |
| 2013/0042071 A1 * | 2/2013 | Chetlur et al. | 711/130 |
| 2014/0098680 A1 * | 4/2014 | Anthony et al. | 370/252 |

(Continued)

FOREIGN PATENT DOCUMENTS

| | | |
|---|---|---|
| EP | 2311200 A2 | 4/2011 |
| EP | 2505009 A1 | 10/2012 |

OTHER PUBLICATIONS

Yin, et al., "Supporting Cooperative Caching in Ad Hoc Networks." IEEE Transactions on Mobile Computing, vol. 5, No. 1, Jan. 2006: Retrieved on Mar. 13, 2013, 13 pages.

(Continued)

*Primary Examiner* — Wing F Chan
*Assistant Examiner* — Leon Y Tseng
(74) *Attorney, Agent, or Firm* — Amin, Turocy & Watson, LLP

(57) ABSTRACT

Cooperative caching systems incorporating Plug-and-Play base stations are described herein. Plug-and-Play base stations with large caching capacities are employed in a wireless network to perform cooperative transmission with macro base stations. Each Plug-and-Play base station can either have wireless backhaul or a low-cost wired backhaul connection to the macro base stations. Cooperative caching systems can direct traffic between the Plug-and-Play base stations and the macro base stations.

20 Claims, 12 Drawing Sheets

(56) References Cited

U.S. PATENT DOCUMENTS

2014/0153504 A1* 6/2014 Wang et al. .................. 370/329
2015/0063206 A1* 3/2015 Kneckt ................ H04W 16/14
　　　　　　　　　　　　　　　　　　　　　　　　　370/328

OTHER PUBLICATIONS

Cao, et al., "Cooperative Cache-Based Data Access in Ad Hoc Networks". IEEE Computer Society, 2004. Retrieved on Mar. 13, 2013, 8 pages.
Herrero, et al., "Distributed Cooperative Caching". Pact'08, Oct. 25-29, 2008, Toronto, Canada (c)2008 ACM. Retrieved on Mar. 13, 2013, 10 pages.
Chow, et al., "Peer-to-Peer Cooperative Caching in Mobile Environments". Proceedings of the 24th International Conference on Distributed Computing Systems Workshops (ICDCSW'04). (c)2004 IEEE. Retrieved on Mar. 13, 2013, 6 pages.
Annapureddy, "Shark: Scaling File Servers via Cooperative Caching". http://www.scs.cs.nyu.edu/shark. Retrieved on Mar. 13, 2013, 14 pages.
Anderson, et al., "New Algorithms for File System Cooperative Caching". 2010 18th Annual IEEE/ACM International Symposium on Modeling, Analysis and Simulation of Computer and Telecommunication Systems. IEEE Computer Society, 1526-7539/10 (c)2010 IEEE. DOI 10.1109/MASCOTS.2010.59. Retrieved on Mar. 13, 2013, 4 pages.
Ming, et al., "Age-based Cooperative Caching in Information-Centric Networks". IEEE INFOCOM 2012 Workshop on Emerging Design Choices in Name-Oriented Networking, 978-1-4673-1017-8/12 (c)2012 IEEE. Retrieved on Mar. 13, 2013, 6 pages.
Karger, et al., "Cooperative Caching Using Hash Routing". 2000, published online at [http://cseweb.ucsd.edu/classes/wi00/cse291/slides/hash-cache.pdf], Retrieved on Nov. 21, 2013, 13 pages.

* cited by examiner

CACHE-INDUCED OPPORTUNISTIC MIMO COOPERATION FOR WIRELESS NETWORKS

CROSS REFERENCE TO RELATED APPLICATION

This application claims priority to U.S. provisional application No. 61/849,000, filed on Jan. 17, 2013 and entitled: "Cooperative MIMO Caching for Wireless Networks." The entirety of this provisional application is incorporated herein by reference.

TECHNICAL FIELD

This disclosure generally relates to wireless networks, e.g., a cooperative MIMO caching architecture to enhance the capacity of wireless network with low-cost backhaul and related embodiments.

BACKGROUND

Wireless service providers are observing an exponential growth in mobile communications due to both an increase in consumer demand and commercial requirements. To ensure customer satisfaction, wireless service providers aim to deliver a high quality service at any location, to facilitate reliable and efficient mobile communications. Consumers can access a growing number of networks using a mobile device. These networks include, for example, 3G networks, 4G networks, long term evolution networks and Wi-Fi networks. These networks allow consumers to communicate voice, text, multimedia, and other data to and from other network entities, such as servers and other mobile devices.

The number of consumers accessing these networks and the amount of bandwidth used by consumers are rapidly increasing. With this rapid increase, mobile traffic is also increasing along the networks placing strain on networks and network resources. The strain can result in a bottleneck restricting data flow, such as at a cellular base station. When networks are strained, consumers can experience a diminished quality of service and become frustrated.

In traditional communications using wireless relays, one or more relays are deployed to help the communications between a source and destinations. However, due to a cut-set bound of wireless networks, a capacity of such relay systems is limited by the communication links from the source to the relay and the destinations. Hence, the relay technique cannot increase the capacity degree of freedom (DoF). Instead, signal to noise ratio (SNR) gain results.

On the other hand, the capacity can be significantly increased in heterogeneous networks by deploying a large number of pico base stations. With high-speed backhaul links for the pico base stations, a system capacity is proportional to the number of pico base stations per unit area. However, the high-speed backhaul links are very expensive, and the heterogeneous network solution is not cost-effective as the number of pico base stations increases.

The above-described background is merely intended to provide an overview of contextual information regarding networks, and is not intended to be exhaustive. Additional context may become apparent upon review of one or more of the various non-limiting embodiments of the following detailed description.

BRIEF DESCRIPTION OF THE DRAWINGS

Numerous aspects and embodiments are set forth in the following detailed description, taken in conjunction with the accompanying drawings, in which like reference characters refer to like parts throughout, and in which.

DETAILED DESCRIPTION

Figure 1:
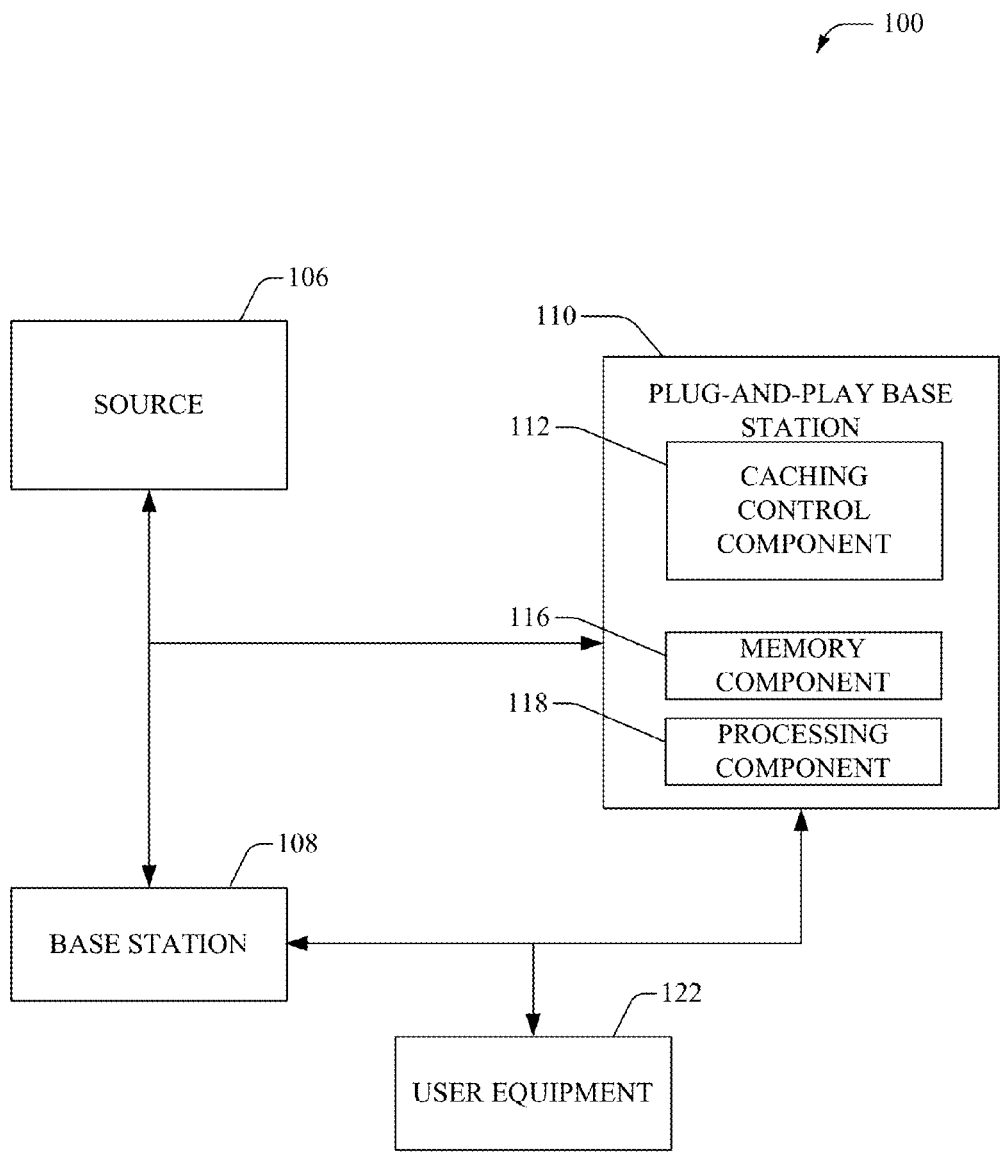
FIG. 1 is an example functional high level block diagram of a system that can facilitate cooperative caching and transmissions in a networked environment, according to an aspect or embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments. Additionally, elements in the drawing figures are not necessarily drawn to scale; some areas or elements may be expanded to help improve understanding of certain aspects or embodiments.

The terms "access point," "server," "base server," (BS) and the like, are utilized interchangeably in the subject application, and refer to a network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

It is noted that, terms "user equipment," "device," "user equipment device," "client," and the like are utilized interchangeably in the subject application, unless context warrants particular distinction(s) among the terms. Such terms can refer to network component(s) or appliance(s) that servers and receives data, voice, video, sound, games, or substantially any data-stream or signaling-stream to or from network components and/or other devices. By way of example, a user equipment device and the like, as used herein and throughout this disclosure, can comprise a mobile device such as an electronic device capable of wirelessly sending and receiving data. A user equipment device may have a processor, a memory, a transceiver, an input, and an output. Examples of such devices include cellular telephones, personal digital assistants, portable computers, tablet computers, hand held gaming counsels, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Furthermore, the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously in the same time (or near the same time) it takes to input and output the same set of samples independent of any processing delay.

Aspects or features of the subject specification can be exploited in substantially any radio access network employing respective radio access technologies, e.g., Wi-Fi, global system for mobile communications, universal mobile telecommunications system, worldwide interoperability for microwave access, enhanced general packet radio service, third generation partnership project long term evolution, fourth generation long term evolution, third generation partnership project 2, ultra mobile broadband, high speed packet access, Zigbee, $x^{th}$ generation, long term evolution, or another IEEE 802.XX technology. Additionally, substantially all aspects of the subject specification can be exploited in legacy telecommunication technologies.

The systems and methods disclosed herein, in one aspect thereof, can steer user traffic along a number of networks via static and/or dynamic network selection policies. A cellular broadcast channel, Wi-Fi channel and the like can send information to a user device to enable intelligent selection of a radio technology (e.g., universal mobile telecommunications system, long term evolution, Wi-Fi, etc.) for delivering and receiving communications of a user device. In another example, a user device can apply a policy based on one or more parameters, such as user subscription profile, a device state, and network states to select a radio technology for communication.

In various embodiments, a source can provide content to network devices, such as a macro base station (BS), a pico BS, and a plug-and-play BS. A BS can receive content and retransmit content to other network devices and/or user equipment devices. The base stations can then "push" or upload the content to a user equipment device.

A plug-and-play BS can cache content according to a caching scheme. For example, a plug-and-play BS can monitor a number of access requests (e.g., hits) to a particular item. The plug-and-play BS can store a number of items based on the number of access requests to the items. The plug-and-play BS can provide control information, comprising a list of packets currently stored in the plug-and-play BS to various network components, such as a BS. The plug-and-play BS can communicate transmittable data (e.g., packets). The transmittable data can be pushed to a user equipment device.

A BS (e.g., macro BS) can schedule a set of users to receive transmissions comprising desired content, such as in packeted transmissions. The BS can determine if the packet, scheduled to be delivered to a user, is in a cache of a plug-and-play BS. If the packet is in the plug-and-play BS, the plug-and-play BS and the BS can perform cooperative transmissions to the user. For example, when a BS determines a packet is contained by a plug-and-play BS, the BS can signal the plug-and-play BS to take over all or some of the transmissions to the user.

In another aspect, when the BS determines that a packet is not stored in a plug-and-play BS and the BS can alternate relay transmission schemes to transmit content to a user from a source. Hence, there is a cooperative MIMO (CO-MIMO) caching gain due to the caching enabled cooperative MIMO transmission. In an aspect, the gain can be proportional to the probability that the scheduled packets are in the plug-and-play BS caches.

In another embodiment, a network statistic collection agent can gather information pertaining to a network. The information can include network characteristics, performance metrics (e.g., bandwidth utilization, load, etc.), requested packets, identifiable content access patterns, and the like. The information can be processed to generate caching policy.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice and/or data traffic) between one or more components can include, wired communications (routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi cannels, satellite channels, and/or the like).

A network, as used herein, typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network.

Various implementations described herein provide cooperative caching for networks, such as wireless networks, many-in-many-out (MIMO) networks, and the like. The implementations can provide cooperative data transmissions to end users, increased efficiency, increased bandwidth, decreased delay times (e.g., round-trip delay times), and the like.

FIG. 1 is an example functional high level block diagram of a system 100 that facilitates cooperative transmissions in a communication network. It is noted that the system 100 can be various other types of networks, including wireless and/or wired connections. While the various components are illustrated as separate components, it is noted that the various components can be comprised in one or more other components. Further, it is noted that the system 100 can comprise additional components not shown for readability. Additionally, various aspects described herein may be performed by one device or on a number of devices in communication with each other. It is further noted that system 100 can be within larger networked environments. In implementations, source 106, BS 108, plug-and-play BS 110, and user equipment device 122 can communicate through wired or wireless channels. In an aspect, plug-and-play BS 110 can have a wireless backhaul or low cost wired backhaul connection with BS 108. In an aspect, plug-and-play BS 110 communicates control signaling with BS 110.

In implementations, system 100 can comprise a source 106, a BS 108, a plug-and-play BS 110, and a user equipment device 122. Source 106 can comprise content and supply (or source) the content to the various components, such as media (video data, image data, audio data, etc.). In an aspect, source 106 can comprise a server (e.g., video on demand server). Source 106 can supply content through various network components such as BS 108, plug-and-play BS 110, etc. It is noted that source 106 can comprise one or more devices, such as a database, server, gateways, interconnection devices, and the like.

Plug-and-play BS 110 can include cache control component 112, memory component 116, and processing component 118. Memory component 116 can comprise one or more memory devices. It is noted that memory component 116 can comprise various types of non-transitory computer readable storage devices. Further, processing component 118 can comprise a computer processor or the like. In an aspect, memory component 116 can store computer executable components, such as cache control component 112. In another aspect, processing component 118 can execute the components.

User equipment device 122 can comprise various devices such as smart phones, tablets, e-readers, digital video recorders, mobile music players, personal computers, servers, memory sticks, digital video recorders (DVRs), consumer electronics and the like. In an aspect, a user can utilize user equipment device 112 to access content in a network (e.g., content stored in source 106 and/or plug-and-play BS 110). For example, a user can utilize a media application executed at least in part by user equipment device 112. User equipment can communicate a signal to a network device (e.g., BS 108, plug-and-play BS 110, and/or source 106). The signal can comprise data representing a request to access content. It is noted that user equipment 122 can communicate the signal to one or more of the network devices. It is further noted that user equipment device 112 can be configured to send a signal to only one device at a time (e.g., BS 108).

In an implementation, BS 108 can receive a signal requesting content (e.g., a packet of data) sent from user equipment device 112. BS 108 can determine whether or not plug-and-play BS 110 contains the requested content and/or a copy of the requested content. In an aspect, BS 108 can maintain a cache content list storing data indicating contents of memory component 116 of plug-and play BS 110. In another aspect, the BS 108 can query plug-and-play BS 110 to determine whether or not the requested contents are in memory component 116 of plug-and play BS 110. It is noted that BS 108 can determine whether or not plug-and-play BS 110 contains the requested content in various other manners (e.g., through source 106, etc.).

In an aspect, plug-and-play BS 110 can cache content in memory component 116 for example. Content can comprise data such as media. In an aspect, content can be in the form of packets. It is noted that plug-and-play BS 110 can cache a set of related packets, such as a set of packets defining a single transferable item (e.g., a video, an audio track, etc.). Memory component 116 can store the content in various storage containers, such as tables, queues, etc. As used herein, memory component 116 can be considered a cache memory that caches content of source 106. It is noted that memory component 116 can cache content stored in various other network components. Further, in implementations various BS's, user equipment devices, or other device can function as source 106.

In implementations, memory component 116 can store statistical data, such as data describing a history of access and/or requests to content, data describing transmission control metrics (e.g., dropped packets, received packets, etc.), data describing items stored in memory component 112, and data describing various other aspects of system 100 (e.g., number of users, network performance, bandwidth provided to users, etc.). It is noted that, network components, such as plug-and-play BS 110, BS 108, and source 106, can monitor data defining network statistics and communicated updated data to memory component 116.

Caching control component 112 can manage (e.g., control) memory component 116 and determine a caching strategy such as what to cache and when to cache. In an aspect, caching control component 112 can determine to store a particular item, remove an item, add an item, and the like. In another aspect, caching control component 112 can manage memory component 116 based on a caching scheme and/or statistical data. In implementations, caching schemes can be based on a popularity metric. Caching control component 112 can determine popularity based on statistical data. For example, a caching control component 112 can store items having a higher relative popularity as determined based on a number of accesses and/or requests. It is noted that a popularity can be based over a period of time. In an aspect, caching control component 112 can determine popularity based on a defined period (e.g., an hour). It is noted that caching control component 112 can determine popularity according to various schemes in addition to or in place of a number of accesses and/or requests. For example, caching control component 112 can cache items based on data defining a projected popularity metric. In a video on demand (VOD) system caching control component 112 can utilize box office attendance, media coverage, date of release, user input, social media mentions, and the like to determine popularity. For example, a video not yet released, may not have any prior accesses and/or requests but can have a relatively high projected popularity.

In another aspect, the caching control component 112 can determine to store a portion of an item. For example, the caching control component 112 can determine an amount of data to store for a particular item based on a determined popularity, cache availability (e.g., available memory space), and/or statistical data associated with a cache. For example, caching control component 112 can determine relative popularities among items and store a larger portion of an item based on a higher relative popularity. It is noted that caching control component 112 can employ a learning algorithm to alter system 100's performance.

It is further noted that caching control component 112 can utilize various control schemes. In an aspect, caching control component 112 can cache items based on item size, transmission times (e.g., average transmission time for an item), creation data, accessibility, and the like. For example, caching control component 112 can determine transmission times (e.g., average round trip transmission, etc.) for items and can store items having relatively higher transmission times. In another example, caching control component 112 can store items having relatively higher transmissions only if the items meet a popularity threshold.

It is noted that caching can comprise storing a copy of an item from one memory (e.g., a memory of source 106) in a different memory such as memory component 116. In various aspects, a cached copy can comprise part of an item or an entire item. In an aspect, caching can decrease access time, increase a capacity of a network, and enhance other aspects of efficiency and/or performance.

Plug-and-play BS 110 can employ caching control component 112 to update a cache (e.g., stored in memory component 116). Updating a cache can comprise adding a new item (e.g., packet and/or group of packets), deleting an item, replacing an item, and/or altering an item, for example. In another aspect, caching control component 112 can update data identifying a cache state. A cache state can include data identifying operations being performed on a cache (e.g., altering items stored in the cache), and/or a list of items stored in the cache.

It is noted that system 100 can utilize a centralized caching control employed at BS 108 or other network device. In a centralized caching control scheme, BS 108 can monitor states of a cache and/or instruct caching control component to perform updates. In a distributed caching control scheme, a plug-and-play BS 110 can manage caching control.

In an implementation, BS 108 can schedule user equipment devices (e.g., such as user equipment device 122) for transmissions, such as to receive packets. BS 108 can determine whether or not plug-and-play BS 110 contains packets scheduled to be transmitted to user equipment device 122. BS 108 can determine a transmission scheme based on determining whether or not plug-and-play BS 110 contains packets scheduled to be transmitted. If plug-and-play BS 110 contains the packets, BS 108 and plug-and-play BS 110 can perform CO-MIMO and/or Multi-user MIMO (MU-MIMO) transmissions to serve user equipment device 122. For example, plug-and-play BS 110 can take over transmissions of the packets to user equipment device 122 as long as plug-and-play BS 110 contains the packets. It is noted that in some cases BS 108 can control transmission even if plug-and-play BS 110 contains the packets if a measured system performance falls below a threshold and/or a number of users meets a threshold. For example, if plug-and-play BS 110 is servicing a large amount of users, plug-and-play BS 110 may experience bottlenecks or other delays. If BS 108 determines that plug-and-play BS 110 does not contain the packets, BS 108 determines and plug-and-play BS 110 can adopt a standard relay transmission to serve this user equipment device 122.

Figure 2:
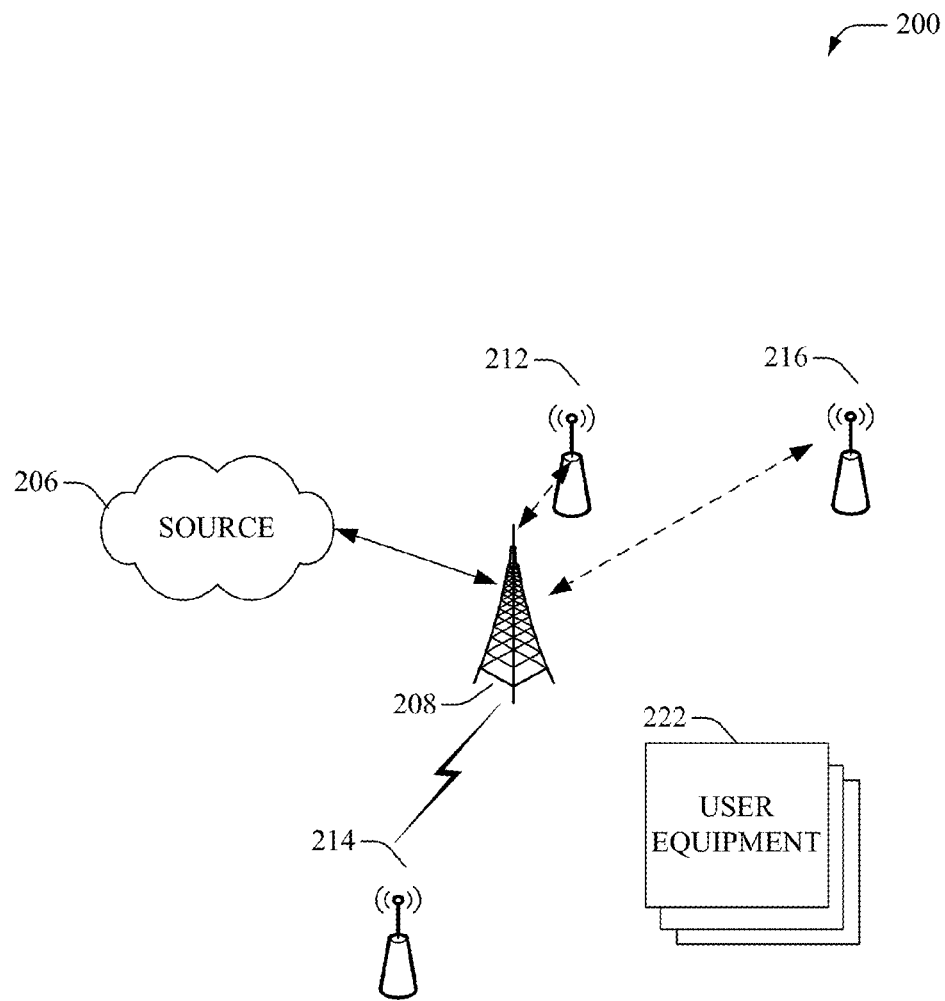
FIG. 2 is an example non-limiting schematic diagram of a system that can facilitate cooperative caching and transmissions in a networked including coordinating transmissions, according to an aspect or embodiment of the subject disclosure.

FIG. 2 is an example non-limiting system 200 for cooperative network management and caching in accordance with an exemplary embodiment of this disclosure. The system 200 can include source 206, BS 208, plug-and-play BS 212, plug-and-play BS 214, plug-and-play BS 216, and user equipment device devices 222 within range of a number of radio access networks (e.g., various cellular networks, Wi-Fi networks, and the like). While the various components are illustrated and described as separate components, it is noted that the various components can be comprised in one or more other components. Further, it is noted that the system 200 can comprise additional components not shown for readability. Additionally, the various components can be contained in one or more devices, or on a number of individual device in communication with each other. It is noted that system 200 can comprise any number of base stations, plug-and-play base stations, and user equipment devices 222.

In an aspect, source 206 can perform similar to source 106 as described above. User equipment devices 222 can comprise a number user equipment devices in rand of network components and can each function similar to user equipment device 122. Unless context suggests otherwise, plug-and-play BS 212, plug-and-play BS 214, and plug-and-play BS 216 can each function similarly to plug-and-play BS 110. It is further noted that BS 208 can function similar to BS 108.

As depicted, BS 208 can be in communication with source 206. BS 208 can have a high speed backhaul connection to source 206. It is noted that a high speed backhaul connection can comprise wired connections (backhaul broadband wired network, an optical fiber connection, twisted-pair line, T1/E1 phone line, digital subscriber line, coaxial cable, and/or the like), and or radio broadcasts (e.g., cellular channels, Wi-Fi cannels, satellite channels, and/or the like). Plug-and-play BS 212 and plug-and-play BS 216 can communicate with BS 208 through a wired backhaul connection. In an aspect, the wired backhaul connection can comprise a low-cost wired connection. Plug-and-play BS 214 can communicated with BS 208 via a wireless backhaul connection.

In an implementation, system 200 can utilize a centralized caching control scheme. In a centralized caching control scheme, BS 208 or another network device can control caching of the plug-and-play BSs 212, 214, and 216. In an aspect, BS 208 can determine cache control schemes and implement the schemes based on data representing statistical information, as described with reference to FIG. 1.

In another implementation, system 200 can utilize a distributed caching control scheme. In a distributed caching control scheme, one or more device can determine caching schemes and implement determined schemes based on data representing statistical information, as described with reference to FIG. 1. For example, one or more of plug-and-play BSs 212, 214, and 216 can determine respective caching schemes. It is noted that not ever plug-and-play BS determines caching schemes in various embodiments.

Figure 3:
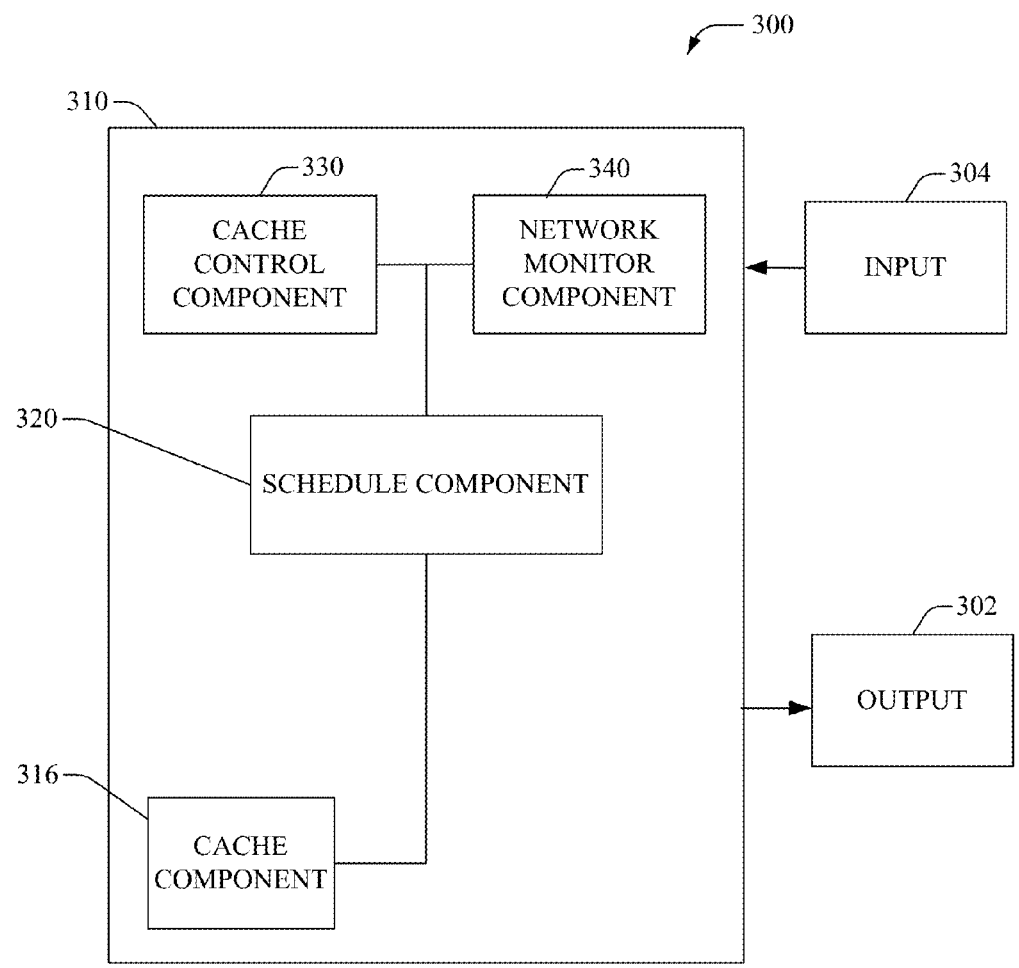
FIG. 3 is an example non-limiting schematic diagram of a system including a schedule component, that can facilitate cooperative caching and transmissions in a networked, according to an aspect or embodiment of the subject disclosure.

FIG. 3 is an example functional high level block diagram of a system 300 that facilitates caching content for cooperative transmissions in a communication network. It is noted that the system 300 can be implemented in various types of networks, including wireless and/or wired connections. While the various components are illustrated as separate components, it is noted that the various components can be comprised in one or more other components. Further, it is noted that the system 300 can comprise additional components not shown for readability. Additionally, various aspects described herein may be performed by one device or on a number of devices in communication with each other. It is further noted that system 300 can be within larger networked environments and/or larger systems. In implementations, system 300 can include a plug-and-play BS 310 that can receive input 304 and generate output 302. Plug-and-play BS 310 can include all or part of the various embodiments disclosed herein, such as system 100, system 200, and the like. Plug-and-play BS 310 can further include cache component 316, schedule component 320, cache control component 330, and network monitor component 340.

Cache control component 330 can include functionality of cache control component 112 of FIG. 100, for example. In another aspect, cache control component 330 can control cache component 316. Cache component 316 can store data representing items of a source, such as items of a media server. In an aspect, cache component 316 can store all or a portion of an item.

In implementations, network monitor component 340 can monitor statistical information associated with a network. Statistical information can include data describing a history of access requests to media items, data describing a history of communications associated with plug-and-play BS 310 (e.g., delivered packets, failed packets, dropped packets, etc.), performance metrics (e.g., transmission speeds), network statistics relating to conditions of a network (e.g., number of user devices in range, e.g.,), and/or other identifiable data associated with a network. Network monitor component 340 can receive input 604 identifying statistical data and/or analyze input 304 to determine statistical data. It is noted that network monitor component 340 can receive control data, such as control variables from network components (e.g., a BS).

In an aspect, cache control component 330 can determine a cache control policy. In implementations, cache control component 330 can determine policies based on statistical information monitored by the network monitor component 340, received control data, and/or schedule accesses. For example, cache control component 330 can determine a policy based on data describing a history of statistical data. In an aspect, cache control component 330 can recognize identifiable patterns and learn network trends. In another aspect, a policy can be based on learned network trends. It is noted that a policy can be determined, in part, based on desired application of system 300. For example, cache control component 330 can determine a cache policy based on a video on demand application and a disparate policy based on a file transfer protocol (FTP) application.

Cache control component 330 can control cache component 316 to add, remove, access, or otherwise alter contents of cache component 316. In an aspect, cache control component 330 can control cache component 316 according to one or more determined policies.

Schedule component 320 can schedule transmissions. A transmission can be data communicated between plug-and-play BS 310 and another network device, such as user equipment and/or a BS. In an aspect, schedule component 320 determines times to send output 302 to appropriate devices. Schedule component 320 can manage a list of scheduled transmission and associated destinations for the transmissions. It is noted that one or more transmissions can be scheduled for a same, a disparate, and/or partially overlapping time In implementations, schedule component 320 can coordinate scheduling transmissions with various network components. For example, schedule component 320 can cooperatively, with a BS for example, transit data to user devices. In an aspect, schedule component 320 can transmit a portion of an item and a BS or disparate plug-and-play BS can send disparate portions of the item.

Figure 4:
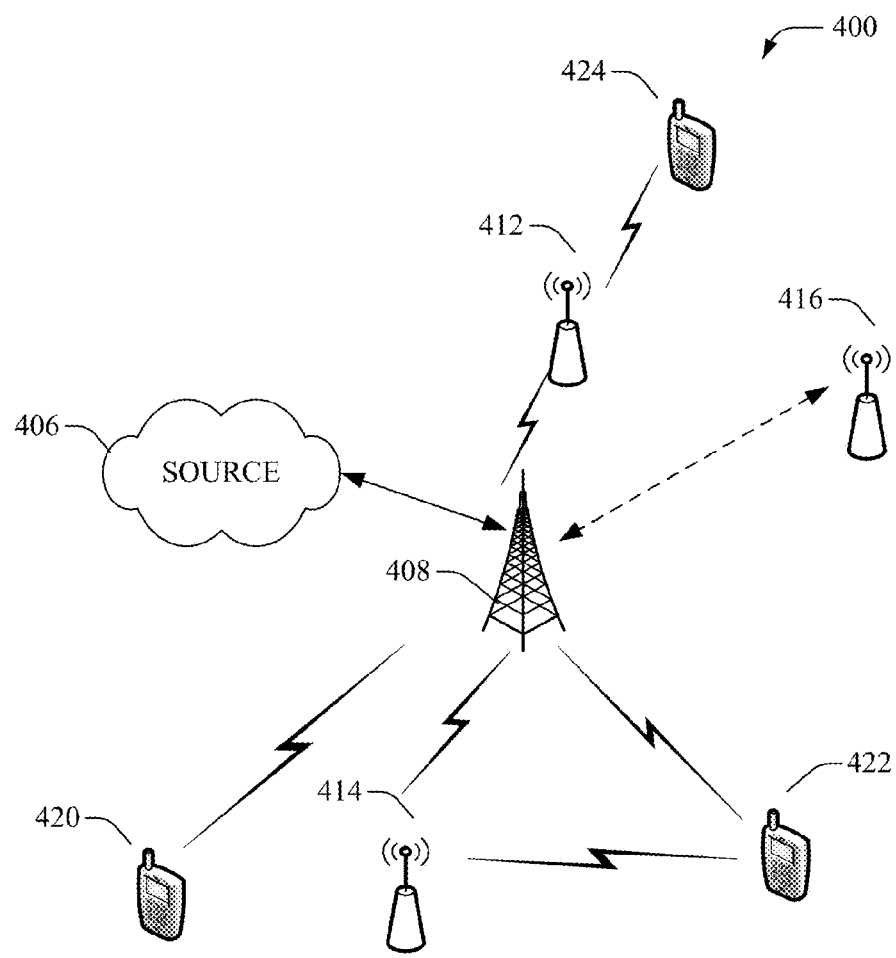
FIG. 4 is an example non-limiting schematic diagram of a system that can facilitate cooperative caching and transmissions in a networked including coordinating cooperative transmissions, according to an aspect or embodiment of the subject disclosure.

FIG. 4 is an example non-limiting environmental diagram or a system 400 that can cooperatively transmit data and can cooperatively cache data. System 400 can comprise source 406, BS 408, plug-and-play BS 412, plug-and-play BS 414, plug-and-play BS 416, user device 420, user device 422, and user device 424. In an aspect, system 400 depicts one or more aspects of system 100, system 200, and/or system 300. For example, BS 408 can function similarly to BS 108 and 208. Likewise, source 406 can comprise aspects of source 106 and 206, and plug-and-play BSs 412, 414, and 416 can comprise functionality of plug-and-play BSs 110, 310, etc.

In implementations, system 400 can operate in various transmission modes. In an aspect, there are close interactions between caching, user selection and physical layer (PHY) transmissions. For example, plug-and-play BSs 412, 414, and 416 caching policies can affect a PHY layer scheme utilized by system 400. In an aspect, BS 408 can determine a PHY transmission mode (Cooperative-MIMO or default relay) based on, for example, cached data, user requests, and the like. In an implementation, BS 408 can determine disparate transmission modes for user device 422 (corresponding to a user device requesting packets in a cache of plug-and-play BS 414), and user device 420 (corresponding to a user device requesting packets not comprised in a cache of any plug-and-play BS (e.g., 412, 414, and 416).

BS 408 can determine scheduling of users. In an aspect, BS 408 can determine scheduling based on a scheduling scheme including whether or not a user device (e.g., 420, 422, 424) is requesting a packet stored in a cache. In another aspect, BS 408 can determine scheduling priorities associated with respective user devices based on a scheduling scheme. A scheduling scheme can be determined, for example, to exploit embodiments described herein. For example, BS 408 can assign a higher priority to user device 424, (representing a device requesting data stored in a cache of plug-and-play BS 412) with respect to a priority assigned to user device 420 that is not requesting data stored in a cache. It is noted that, specific user selection and/or scheduling schemes can be application dependent.

In implementations, various components of system 400 can communicate, for example, control data. In an aspect, control data can represent data sent from a plug-and-play BS (e.g., plug-and-play BS 412) to another plug-and-play BS, BS 408, and the like. For example, plug-and-play BS 412 can send information describing a cache state to BS 408. The information describing a cache state can indicate that plug-and-play BS 412 added (is adding and/or will add) a new packet, dropped (is dropping and/or will drop) an existing packet in the cache, and the like.

In implementations, plug-and-play BS 412 can limit adding/dropping items according to a determined caching scheme. Limiting adding/dropping items can be based on, for example, data representing statistical network data, performance metrics, and the like. For example, plug-and-play BS 412 can limit adding and/or dropping based on a time period, an amount of data to add and/or drop, and the like. In another example, plug-and-play BS 412 can limit adding and/or dropping to entire segments of data, where a segment consists of L consecutive packets and L is a number. It is noted that a segment does not need to be consecutive packets, additionally consecutive packets can be packets associated with a single item, and/or multiple items.

In an example, system 400 can represent a network capable of providing video on demand services. Source 406 can include J video files, stored on a server for example, where the size of the j-th video file is $V_j$ bits, where J, and $V_j$ are numbers. It is noted that any number of user devices can request the j-th video file. Accordingly, let $K_j$ represent a number of users accessing (e.g., streaming) the j-th video file, where K is a number. For simplicity, assume the download rate (e.g., streaming and/or playback rate) is the same for each of the J video files. It is noted, that source 405 can include one or more servers, gateways, and the like. The radio access network consists of a regular BS (connected to the gateway via backhaul) and a PBS.

It is noted that each user device (e.g., user device 420, user device 422, and user device 423) can maintain a respective queue for content, such as a queue for video playback. In an aspect, a queue can contain content received from network components. An arrival rate can be random due to the nature of system 400. A departure rate (playback rate) can be constant depending on the specific device. A QoS constraint can be a probability of interruption (e.g., interrupted playback) meeting a threshold. In an aspect, BS 408 can determine a performance metric representing a number of users that can be supported under the QoS constraint.

Continuing with the above example, a plug-and-play BS (e.g., plug-and-play BS 414) can include a cache having a size of B bits, where B is a number. It is noted that plug-and-play BS 414 does not have a high speed backhaul connection to BS 408. The cache can store a fraction $q_j$ of the j-th video file. A plug-and-play BS (e.g., plug-and-play BS 424) can determine a cache control variable $q_j$ to minimize a maximum interruption probability of all users under a caching size constraint, such as: $\Sigma_{j=1}^{L} q_j V_j \leq B$.

In an aspect, BS 408 can schedule user devices at time slots. At each time slot, BS 408 can partition users into sets. For example, BS 408 can partition users into two sets: $u_A$ and $u_B$, where $u_A$ denotes a set of users whose current packets are not in a plug-and-play BS cache (e.g., user device 420), and $u_B$ denotes a set of users whose current packets are in a plug-and-play BS cache (e.g., user device 424 having associated packets in a cache of a plug-and-play BS 412). Let $K_A$ and $K_B$ respectively denote a number of users in $u_A$ and $u_B$. BS 408 can determine a transmission mode and/or policy based on network statistics (e.g., number of users, available channels of communication, and the like).

In a first case, a number of users whose current packets are in a plug-and-play BS can be zero (e.g., $K_B=0$). BS 408 can select M users, where M is a number representing a number of available channels for communication (e.g., number of antennas channels of BS 408 and/or a plug-and-play BS). BS 408 and plug-and-play base stations (e.g., 414, 416, and 412) can utilize conventional transmission techniques. For example, BS 408 can communicate with user devices and/or utilize a plug-and-play BS as a relay to communicate with user devices. In another aspect, BS 408 can schedule user devices on a first come basis, based on requested packet size, user device data usage, and the like.

In a second case, a number of users whose current packets are in a plug-and-play BS cache can be greater than zero but less than an available number of channels (e.g., $1 < K_B < M$). BS 408 can select the $K_B$ users in $u_B$ and $2M-K_B$ users with the $2M-K_B$ shortest Queue length from $u_A$, for a scheduling time slot. BS 408 and plug-and-play BS can serve users in $u_B$ using Co-MIMO transmission and the other selected users in $u_A$ using conventional relay transmission, in accordance with various embodiments disclosed herein.

In a third case, a number of users whose current packets are in a plug-and-play BS cache can be greater than or equal to a number of available channels (e.g., $K_B \geq M$). BS 408 can select a min ($K_B$, 2M) users with a min ($K_B$, 2M) shortest Queue length from $u_B$. BS 408 and plug-and-play BSs can serve the selected users using Co-MIMO transmission, in accordance with various embodiments disclosed herein.

In implementations additional and/or disparate cases can be defined. It is noted that BS 408 and/or one or more of plug-and-play BS 412, plug-and-play BS 414, and plug-and-play BS 416 can schedule one or more of user device 420, user devices 422, and user devices 424 according to various scheduling schemes. It is further noted, that system 400 can comprise additional components and while various components are described as having functionality, various other components can comprise the described functionality.

In another aspect, system 400 can determine transmission modes and/or policies based on network characteristics, such as PHY characteristics. In an aspect, a PHY characteristic can include types of connections (e.g., backhaul connection, etc.). For example, BS 408 can determine different policies for plug-and-play BS 416, utilizing a backhaul connect to BS 408 (e.g., dotted line), and for plug-and-play BS 414 utilizing a wireless connection to BS 408. In an aspect, a backhaul connection can be used to reduce a backhaul loading/requirement.

In an embodiment, BS 408 can send requested packets that are not in plug-and-play BS 416 via a backhaul. It is noted that a probability that a request packet is not in plug-and-play BS 416 cache can be proportional to a cache size of a cache of plug-and-play BS 416. In a backhaul connection, at each time slot of a schedule, BS 408 can select users with shortest Queue lengths from $u_B$. If $K_B<2M$, BS 408 selects additional $2M-K_B$ users with the $2M-K_B$ shortest Queue length from $u_A$. Then BS 408 can send payload data of the selected $2M-K_B$ users in $u_A$ to plug-and-play BS 416 via backhaul connection.

Figure 5:
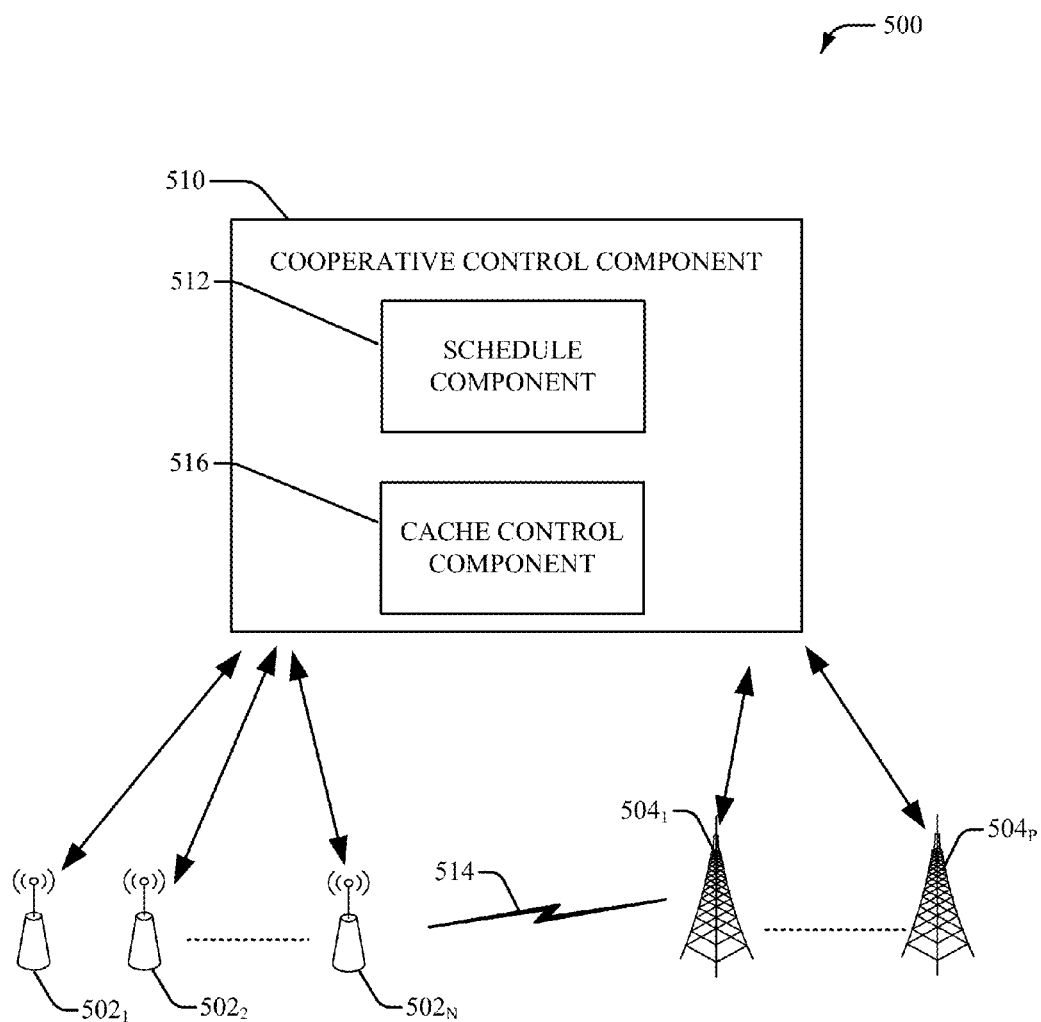
FIG. 5 is an example non-limiting schematic diagram of a system, including a cache control component, that can facilitate cooperative caching and transmissions in a networked, according to an aspect or embodiment of the subject disclosure.

FIG. 5 is an example non-limiting schematic diagram of a system 500 that facilitates cooperative caching and transmissions in a networked environment. System 500 can comprise various embodiments described herein. While the various components are illustrated as separate components, it is noted that the various components can be comprised in one or more other components. Further, it is noted that the system 500 can comprise additional components not shown for readability. Additionally, the various components may be contained on one device, or on a number of device.

System 500 can comprise a cooperative control component 510 that can control transmissions in a network and/or operations associated with caching content. In an aspect, cooperative control component 510 comprises a schedule component 512 and a cache control component 516. In another aspect, system 500 can include a set of N plug-and-play base stations $502_1$-$502_N$, where N is a number, and a set of P base stations ($504_1$-$504_P$). It is noted that each plug-and-play base stations $502_1$-$502_N$ can communicate with each other, one or more base stations ($504_1$-$504_P$), and cooperative control component 510. Likewise base stations ($504_1$-$504_P$) can communicate with each other, one or more plug-and-play base stations $502_1$-$502_N$, and/or cooperative control component 510. Connection 514 can represent a wireless connection and/or a wired connection between the various components. It is noted that base stations ($504_1$-$504_P$) and plug-and-play base stations $502_1$-$502_N$ can comprise various aspects disclosed herein.

Cooperative control component 510 can comprise various other components not shown for readability. It is noted that cooperative control component 510 can comprise aspects of various embodiments described herein. It is further noted that cooperative control component 510 can be comprised in larger systems and/or devices, such as a server, any of base stations ($504_1$-$504_P$), and/or any of plug-and-play base stations $502_1$-$502_N$. Likewise, system 500 can comprise additional cooperative control components that cooperate to perform aspects of embodiments described herein.

Cooperative control component 510 can receive data describing network statistics, devices connected to a network and/or within range of a network, cache states of caches comprised in plug-and-play base stations $502_1$-$502_N$, control signals, data relating to scheduling, and the like. In an aspect, schedule component 512 can manage transmission schedules based on received data. For example, schedule component 512 can schedule transmissions and associated user devices among various components to cooperatively service user devices. In another aspect, schedule component 512 can determine transmission schemes associated with a network, such as determining what components transmit select data and where components transmit data to.

Cache control component 516 can manage one or more caches associated with plug-and-play base stations $502_1$-$502_N$, for example. Cache control component 516 can determine cache contents and/or whether or not contents of a cache should be altered, as described herein. In another aspect, cache control component 516 instruct base stations ($504_1$-$504_P$) and/or any of plug-and-play base stations $502_1$-$502_N$, to perform actions, such as alter cache content, transmit data, etc.

FIGS. 6-9 illustrate methods 600, 700, 800, and 900 that cooperative caching and transmissions in a networked environment. For simplicity of explanation, the methods (or procedures) are depicted and described as a series of acts. It is noted that the various embodiments are not limited by the acts illustrated and/or by the order of acts. For example, acts can occur in various orders and/or concurrently, and with other acts not presented or described herein. In another aspect, the various acts can be performed by systems and/or components of embodiments described herein.

Figure 6:
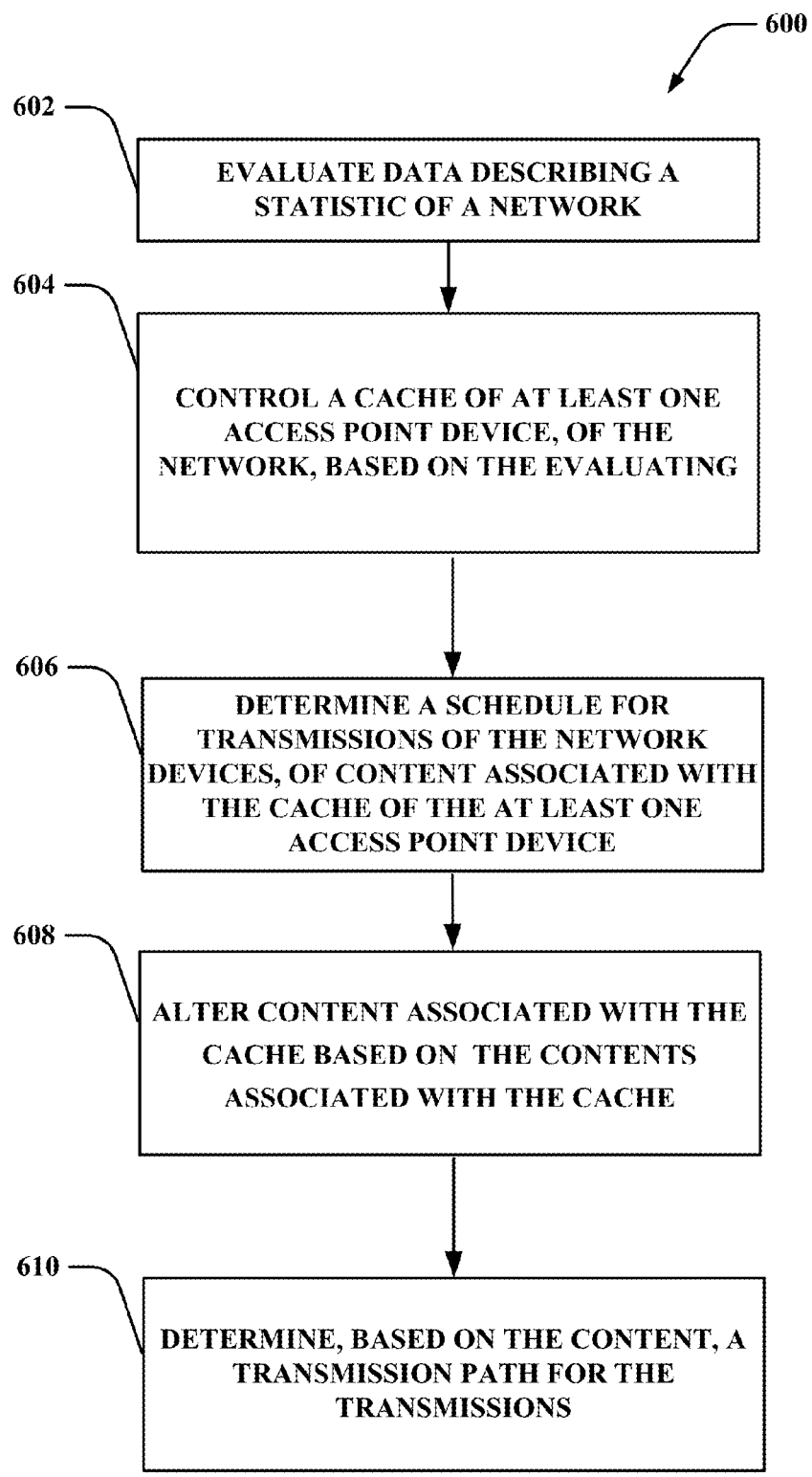
FIG. 6 is an example non-limiting process flow diagram of a method that can facilitate cooperative caching and transmissions in a networked environment, according to an aspect or embodiment of the subject disclosure.

FIG. 6 illustrated is an example non-limiting process flow diagram of a method 600 that facilitates cooperative caching and transmissions in a networked environment. The cooperative caching and transmissions can be performed by various implementations described herein.

At 602, a system can evaluate data describing a statistic of a network. In an aspect, a statistic can comprise one or more measurements of a network, a physical characteristic of a network, and the like. Evaluating data describing a statistic of a network can include determining performance metrics, determining popularity metrics, determining network characteristics, and the like.

At 604, a system can control a cache of at least one access point device, of the network, based on the evaluating. Controlling a cache can comprise determining to alter and/or altering contents of the cache (e.g., add/remove items), determining a caching policies, implementing a caching policy, updating control variables, and the like.

At 606, a system can determine a schedule for transmissions of the network devices, of content associated with the cache of the at least one access point device. For example, a system can associate a plug-and-play base station with a transmission. The system can determine select a time slot for the transmission. In another aspect, scheduling transmissions can schedule transmissions between plug-and-play base station, macro base stations, source devices, user devices, and the like. It is noted that the system can determine a transmission mode and/or scheme according to the evaluation of the data describing the statistic of the network.

At 608, a system can alter content associated with the cache based on the contents associated with the cache. In an example, a system can determine the popularity metric based on the evaluation of the data describing the statistic of the network, as described herein. In another aspect, a system can utilize a caching policy to determine alterations. In an aspect, altering contents can include instruction a caching device to perform alterations (e.g., adding/removing items). It is noted that altering a contents of a cache can include updating a list describing the contents of the cache.

At 610, a system can determine, based on the content, a transmission path for the transmissions. In an aspect, determining a transmission path can include selecting a transmission path based on a physical layer connection between network devices. For example, a system can select a back haul connection between two network devices (e.g., a plug-and-play base station and a macro base station) or can select a wireless connection between network devices.

Figure 7:
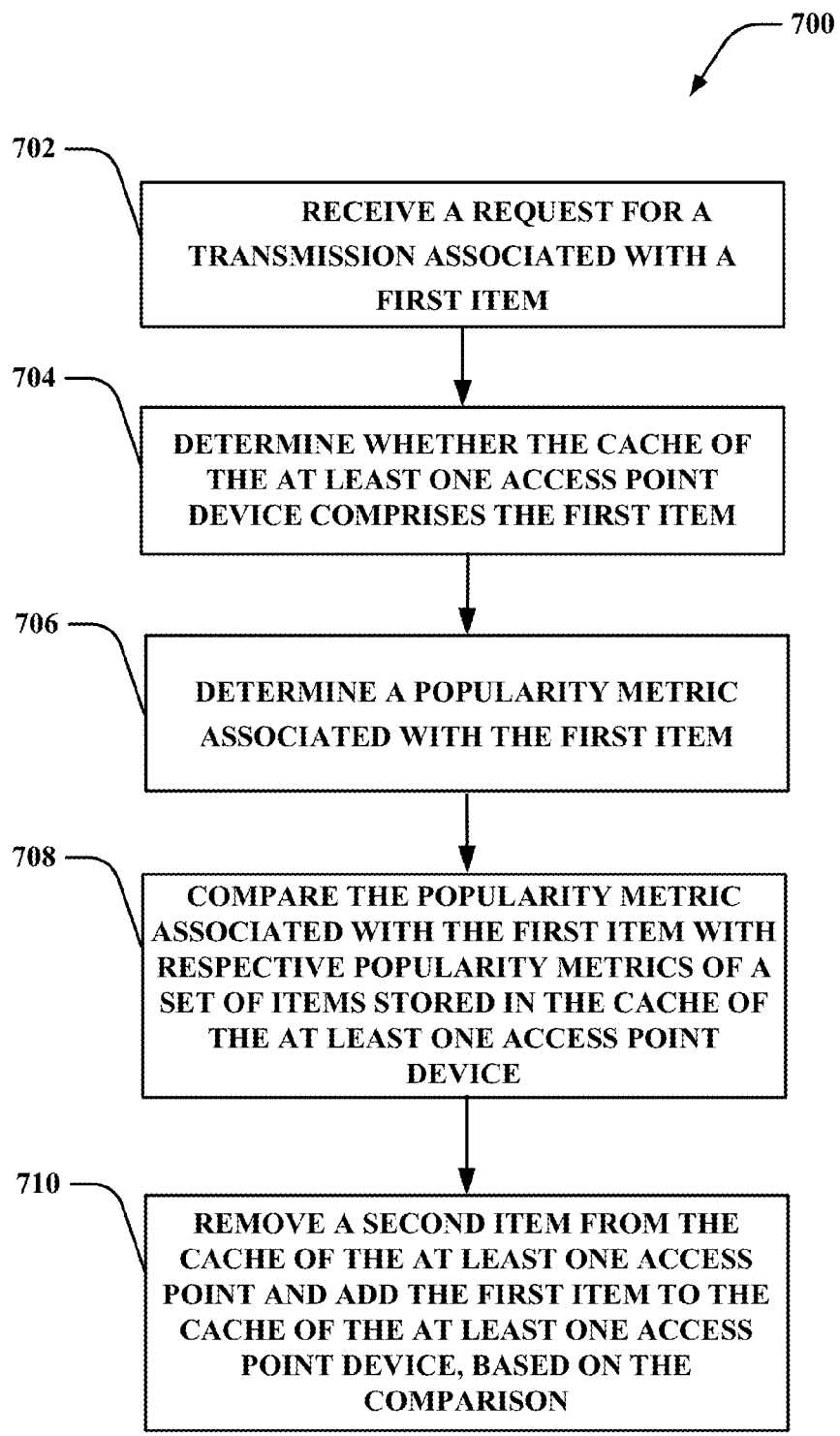
FIG. 7 is an example non-limiting process flow diagram of a method that can facilitate cooperative caching and transmissions in a networked environment including altering a contents of a cache, according to an aspect or embodiment of the subject disclosure.

FIG. 7 illustrated is an example non-limiting process flow diagram of a method 700 that cooperative caching and transmissions in a networked environment including altering a contents of a cache. The cooperative caching and transmissions can be performed by various implementations described herein.

At 702, a system can a receive a request for a transmission associated with a first item. For example, a user device can sent a request, to the system, associated with the first item. It is noted that an item can comprise a packet of data, a portion of a packet of data, and/or a set of packets of data.

At 704, a system can determine whether the cache of the at least one access point device comprises the first item. In an aspect, a system can determine whether or not the cache of the at least one access point comprises the first item based on a list of the contents of the cache. In another aspect, a system can search a cache for the item.

At 706, a system can determine a popularity metric associated with the first item. For example, a system can determine the popularity metric based on data describing a statistic of the network. It is noted that the system can determine the popularity metric based on a number of requests to the item, comparison of requests to other items, based on a time period, and the like.

At 708, a system can compare the popularity metric associated with the first item with respective popularity metrics of a set of items stored in the cache of the at least one access point device. For example, the system can compare the determined popularity metrics with metrics associated with other items in a cache and/or items in a source device. It is noted that a system can comprise a list of popularity metrics.

At 710, a system can remove a second item from the cache of the at least one access point and add the first item to the cache of the at least one access point device, based on the comparison. In an aspect, the second item can correspond to an item having a lowest relative popularity metric respective of other items comprised in a cache. It is noted that the system can select the second item based on other statistical data, such as a rate at which an item is decreasing with respect to a popularity metric, for example.

Figure 8:
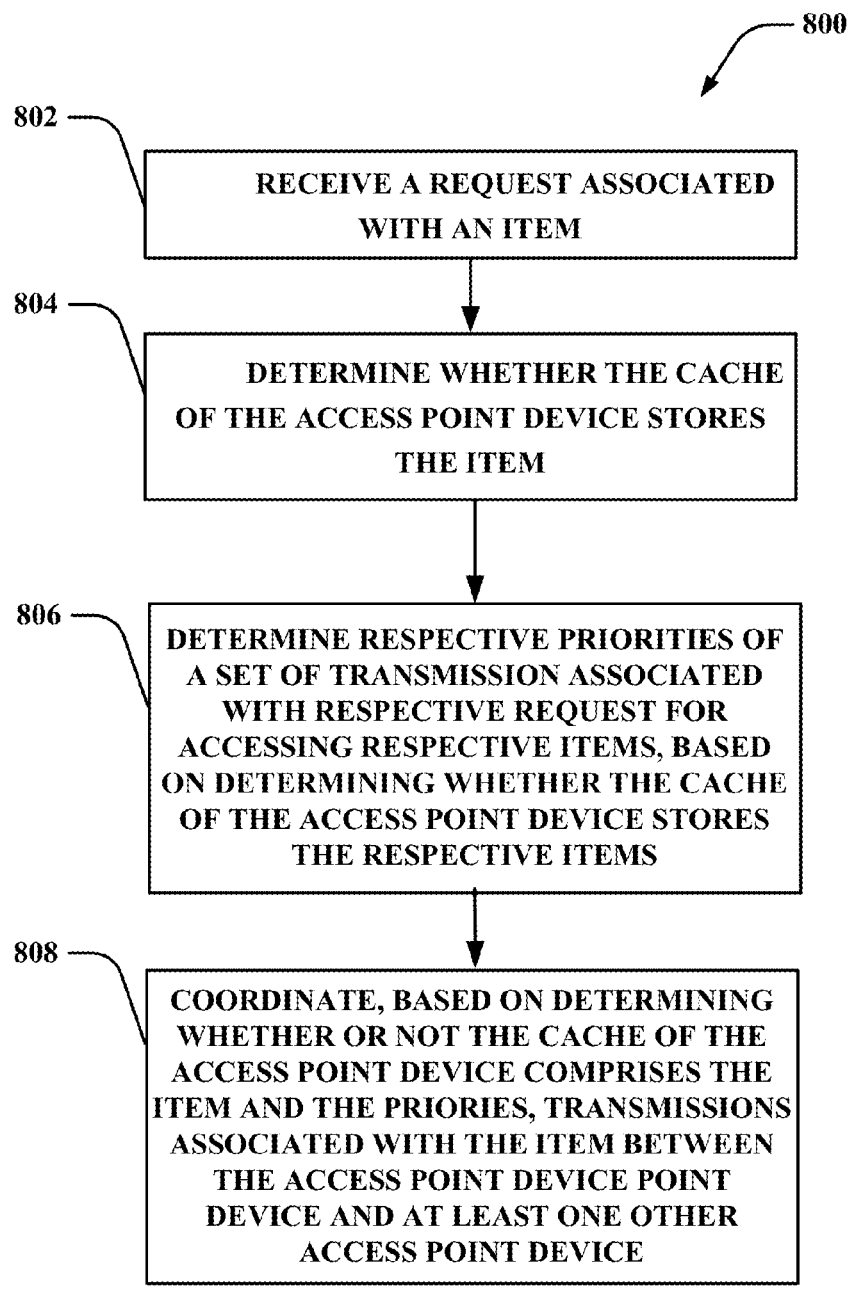
FIG. 8 is an example non-limiting process flow diagram of a method that can facilitate cooperative caching and transmissions in a networked environment including coordinating transmissions, according to an aspect or embodiment of the subject disclosure.

FIG. 8 illustrates an example non-limiting process flow diagram of a method 800 that can facilitate cooperative caching and transmissions in a networked environment including coordinating transmissions. The cooperative caching and transmissions can be performed by various implementations described herein.

At 802, a system can receive a request associated with an item. For example, a user device can sent a request, to the system, associated with a first item. It is noted that an item can comprise a packet of data, a portion of a packet of data, and/or a set of packets of data.

At 804, a system can determine whether the cache of the access point device stores the item. In an aspect, a system can determine whether or not the cache of the at least one access point comprises the first item based on a list of the contents of the cache. In another aspect, a system can search a cache for the item.

At 806, a system can determine respective priorities of a set of transmission associated with respective request for accessing respective items, based on determining whether the cache of the access point device stores the respective items. For example, a higher priority can be assigned with requests associated with an item comprised in the cache. In an aspect, a propriety can also be based on various other metrics, such as data describing a history of use associated with a user device associated with a request, a size of an item, and the like.

At 808, a system coordinate, based on determining whether or not the cache of the access point device comprises the item and the priories, transmissions associated with the item between the access point device point device and at least one other access point device. It is noted that coordinating transmissions can include scheduling transmissions, determining transmission paths, and the like.

Figure 9:
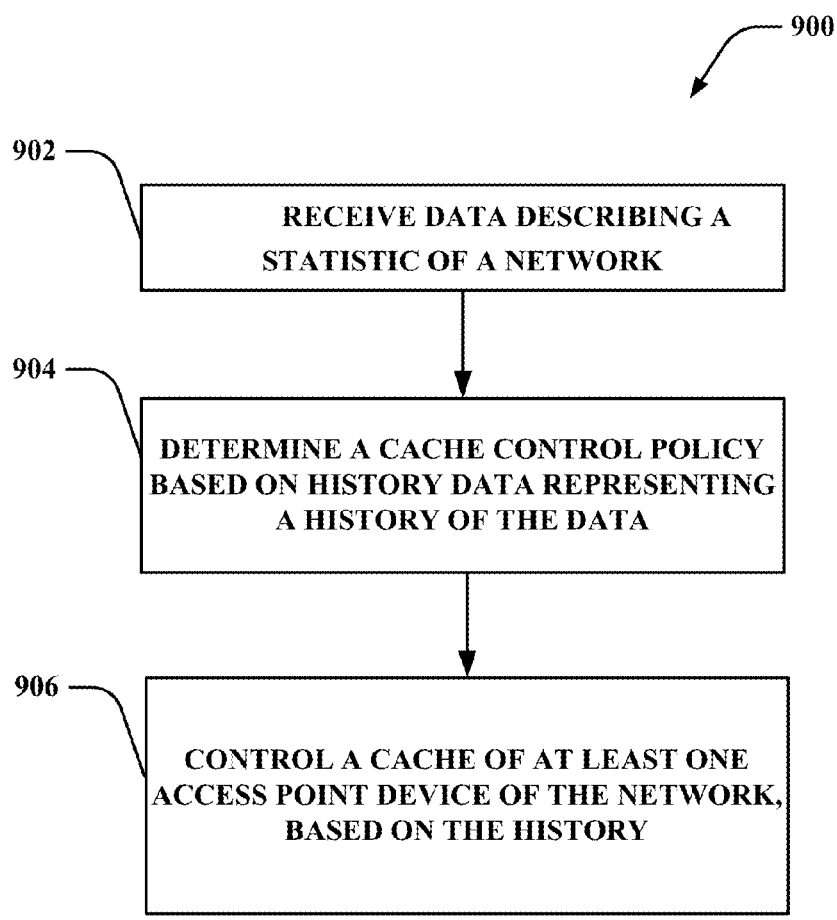
FIG. 9 is an example non-limiting process flow diagram of a method that can facilitate cooperative caching and transmissions in a networked environment including determining a cache control policy, according to an aspect or embodiment of the subject disclosure.

FIG. 9 illustrated is an example non-limiting process flow diagram of a method 900 that can facilitate cooperative caching and transmissions in a networked environment including determining a cache control policy. The cooperative caching and transmissions can be performed by various implementations described herein.

At 902, a system can receive data describing a statistic of a network. In an aspect, a system can measure the data describing the statistic of the network.

At 904, a system can determine a cache control policy based on history data representing a history of the data. In implementations, determining cache control policies can be based on data describing a history of statistical data. In an aspect, a system can recognize identifiable patterns and learn network trends. In another aspect, a policy can be based on the learned network trends. It is noted that a policy can be determined, in part, based on desired application of a system. For example, a cache control policy cache can be determined a based on a video on demand application and a disparate policy based on a file transfer protocol (FTP) application.

At 906, a system can control a control a cache of at least one access point device of the network, based on the history. In various implementations, a system can alter a cache by adding/removing items according the evaluation of data describing a statistic of the network and the cache control policy.

Figure 10:
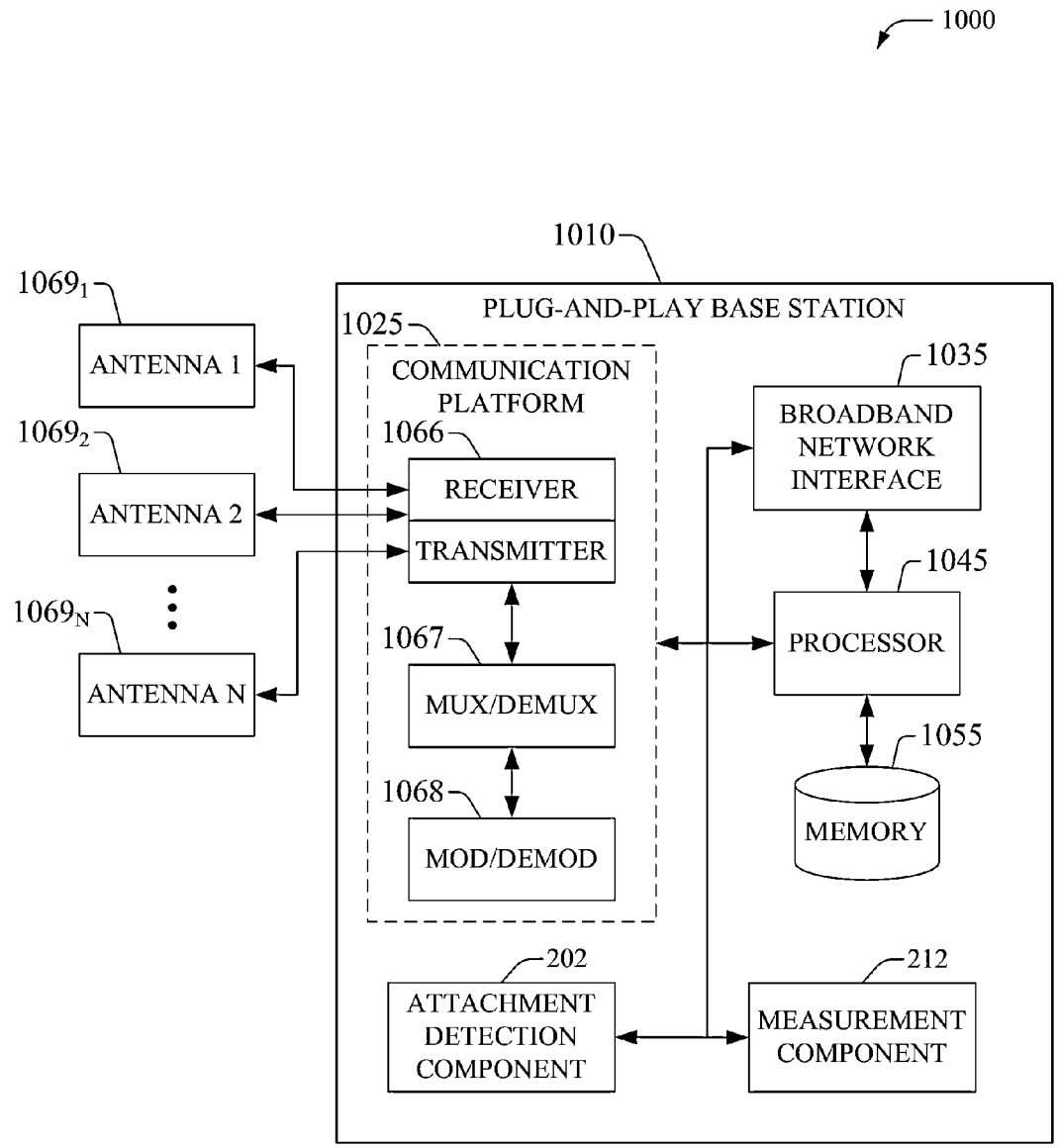
FIG. 10 illustrates an example embodiment of a plug-and-play access point that can cooperatively cache items to facilitate cooperative caching and transmissions, according to the subject disclosure.

With respect to FIG. 10, in example embodiment 1000, Plug-and-Play BS 1010 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 can include a transmitter/receiver (e.g., a transceiver) 1066 that can convert signal(s) from analog format to digital format (e.g., analog-to-digital conversion) upon reception, and from digital format to analog (e.g., digital-to-analog conversion) format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and/or frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Plug-and-Play BS 1010 also includes a processor 1045 configured to confer functionality, at least partially, to substantially any electronic component in the Plug-and-Play BS 1010, in accordance with aspects of the subject disclosure. In particular, processor 1045 can facilitate Plug-and-Play BS 1010 to implement configuration instructions received through communication platform 1025, which can include storing data in memory 1055. In addition, processor 1045 facilitates Plug-and-Play BS 1010 to process data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beam-forming or selective radiation pattern formation, which can benefit specific locations (e.g., basement, home office . . . ) covered by Plug-and-Play BS; and exploit substantially any other advantages associated with smart-antenna technology. Memory 1055 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; Plug-and-Play BS address(es) or geographical indicator(s); access lists (e.g., white lists); license(s) for utilization of add-features for Plug-and-Play BS 1010, and so forth. In one example, data store 206 can be implemented in memory 1055.

In embodiment 1000, processor 1045 can be coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources . . . ; not shown) that support Plug-and-Play BS 1010. The Plug-and-Play BS 1010 can further include an attachment detection component 202 and measurement component 212, which can include functionality, as more fully described herein, for example, with regard to systems 200. In addition, it is to be noted that the various aspects disclosed in the subject specification can also be implemented through (i) program modules stored in a computer-readable storage medium or memory (e.g., memory 1055) and executed by a processor (e.g., processor 1045), or (ii) other combination(s) of hardware and software, or hardware and firmware.

Figure 11:
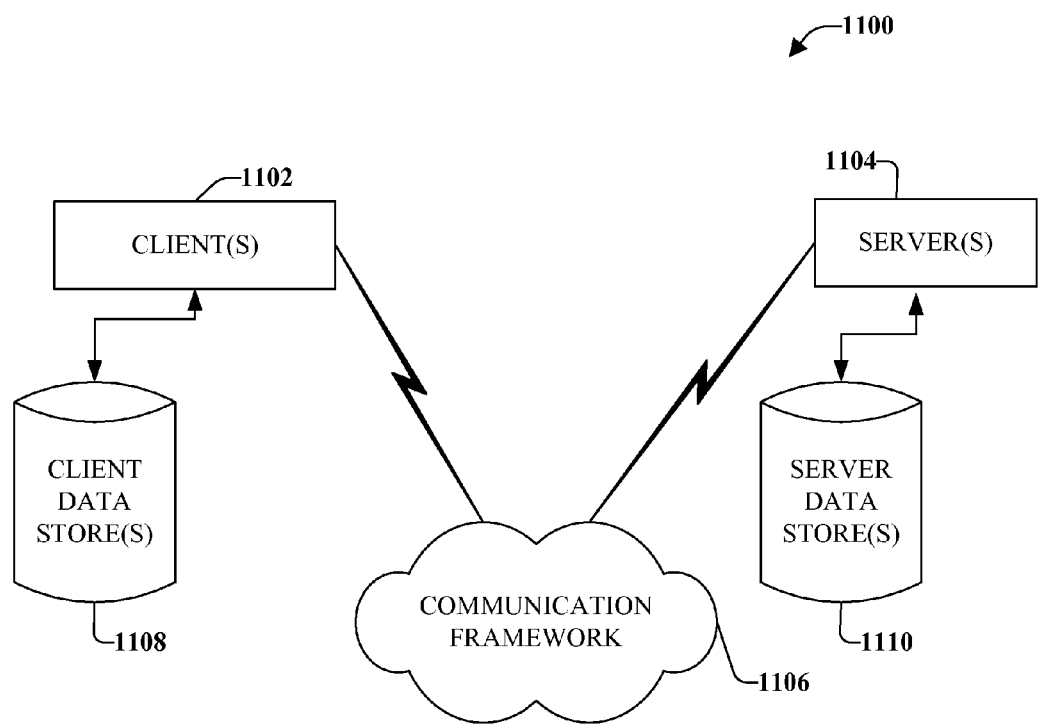
FIG. 11 illustrates an example schematic block diagram of a computing environment in accordance various aspects of this disclosure.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet adapted to be transmitted between two or more computer processes wherein data packets may include coded items. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one implementation, a server 1104 can transfer an encoded file, (e.g., network selection policy, network condition information, etc.), to client 1102. Client 1102 can store the file, decode the file, or transmit the file to another client 1102. It is noted, that a server 1104 can also transfer uncompressed file to a client 1102 and client 1102 can compress the file in accordance with the disclosed subject matter. Likewise, server 1104 can encode information and transmit the information via communication framework 1106 to one or more clients 1102.

Figure 12:
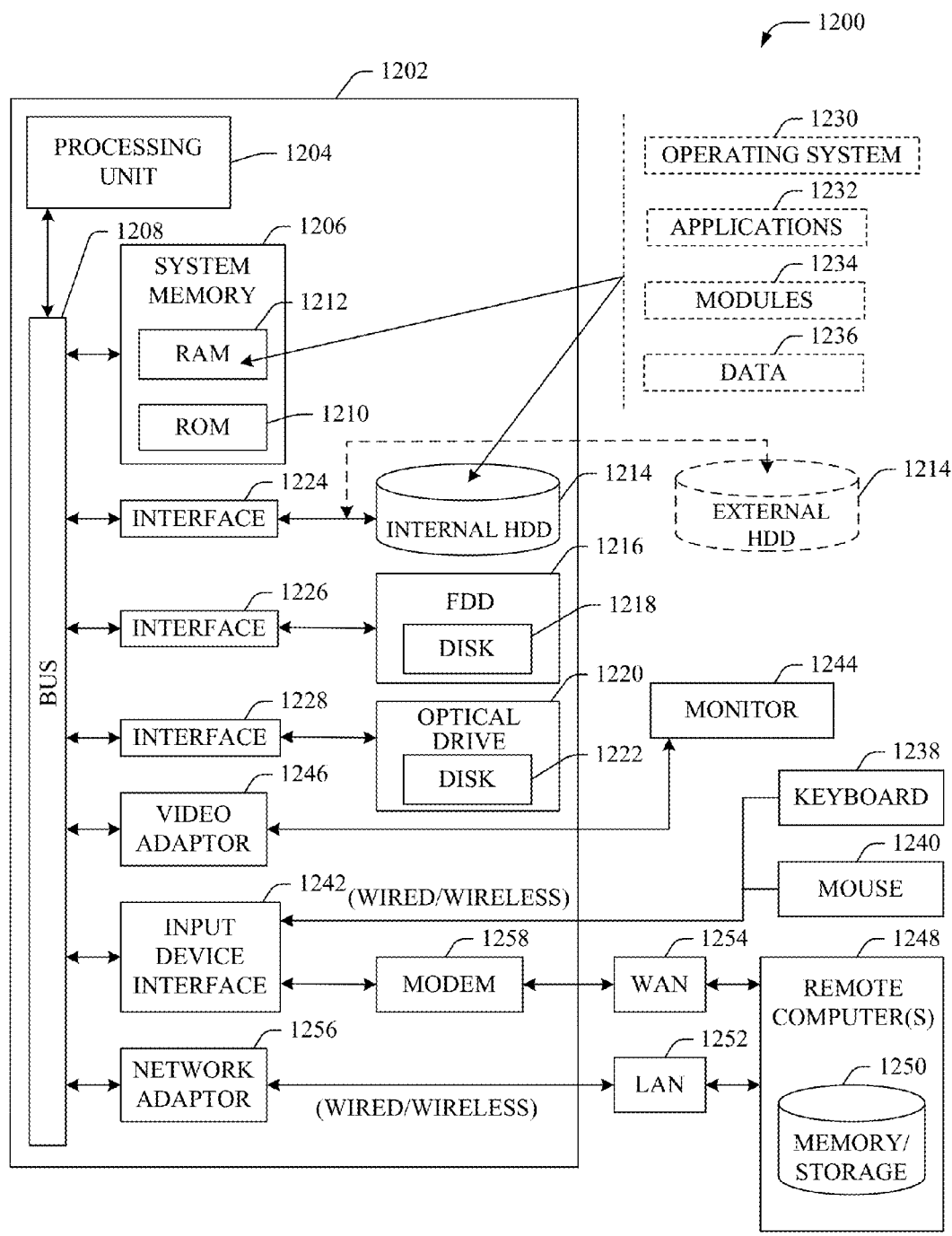
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, it is noted that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system is stored in a non-volatile memory 1210 such as ROM, erasable programmable read only memory, electrically erasable programmable read only memory, which basic input/output system contains the basic routines that help to transfer information between elements within the computer 1202, such as during startup. The RAM 1212 can also include a high-speed RAM such as static RAM for caching data.

The computer 1202 further includes an internal hard disk drive 1214 (e.g., EIDE, SATA), which internal hard disk drive 1214 can also be configured for external use in a suitable chassis (not shown), a magnetic floppy disk drive 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is noted that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/ wireless connectivity to a local area network 1252 and/or larger networks, e.g., a wide area network 1254. Such local area network and wide area network networking environments are commonplace in offices and companies, and facilitate enterprise-wide computer networks, such as intranets, all of which can connect to a global communications network, e.g., the Internet.

When used in a local area network networking environment, the computer 1202 is connected to the local network 1252 through a wired and/or wireless communication network interface or adapter 1256. The adapter 1256 can facilitate wired or wireless communication to the local area network 1252, which can also include a wireless access point disposed thereon for communicating with the wireless adapter 1256.

When used in a wide area network environment, the computer 1202 can include a modem 1258, or is connected to a communications server on the wide area network 1254, or has other means for establishing communications over the wide area network 1154, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It is noted that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, BLUETOOTH™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It is noted that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor, coupled to at least one memory, that executes or facilitates execution of computer-executable components stored in the at least one memory, the computer-executable components, comprising:
   a cache control component configured to instruct a first cache of a first access point (AP) device wirelessly coupled to a user equipment (UE) and a second cache of a second AP device wirelessly coupled to the UE to store common content based on an evaluation of data describing a statistic of a network; and
   a scheduling component configured to:
      receive, from the UE, a request to access a requested item;
      in response to a requested portion of the requested item being determined to have been stored in the first cache of the first AP device and the second cache of the second AP device, assign a first scheduling priority to the UE for facilitating a cooperative multiple-input and multiple-output (MIMO) transmission to the UE, and
      select a cooperative MIMO transmission mode comprising first instruction data instructing the first AP device and the second AP device to cooperatively transmit, according to the first scheduling priority, the requested portion of the requested item from the first cache of the first AP device and the second cache of the second AP device to the UE utilizing a common wireless transmission channel; and
      in response to the requested portion of the requested item being determined to not have been stored in the first cache of the first AP device and the second cache of the second AP device, assign a second scheduling priority to the UE for facilitating a relay transmission to the UE, and select a relay transmission mode comprising second instruction data instructing the first AP device to individually transmit, according to the second scheduling priority, the requested portion of the requested item to the UE, wherein the first scheduling priority is greater than the second scheduling priority.

2. The system of claim 1, wherein the cache control component is further configured to:
   perform an evaluation of content of the first cache or the second cache; and
   alter the content based on the evaluation of the content.

3. The system of claim 1, wherein the cache control component is further configured to:
   determine a popularity metric of a first item based on the data describing the statistic of the network; and
   determine whether to alter content of the first cache or the second cache based on an evaluation of the content and the popularity metric of the first item.

4. The system of claim 3, wherein the cache control component is further configured to:
   in response to determining that the content is to be altered, remove at least a removed portion of a second item from the first cache or the second cache and add at least an added portion of the first item to the first cache or the second cache.

5. The system of claim 1, wherein the second AP device comprises a macro AP device.

6. The system of claim 1, wherein the cache control component is further configured to alter the data describing the statistic of the network based on an updated set of data describing the statistic of the network.

7. The system of claim 1, wherein the cache control component is further configured to determine, based on statistics of the data describing the statistic of the network, a cache control policy.

8. The system of claim 7, wherein data describing the statistic of the network describes a history associated with requested content.

9. The system of claim 1, wherein the cache control component is further configured to:
   instruct, based on the relay transmission mode, the first AP device to retrieve other data associated with the requested item via a backhaul connection.

10. A method, comprising:
    evaluating, by a system comprising a processing device, data representing a statistic of a network;
    in response to the evaluating, controlling caches of respective access point devices of the network;
    in response to a requested item being determined to have been stored in the caches, assigning a first scheduling priority to a mobile device for facilitating a multiple-input and multiple-output (MIMO) transmission to the mobile device, and sending first instruction data to the respective access point devices directing the respective access point devices to cooperatively transmit, using a wireless transmission channel of a MIMO transmission mode, the requested item from the caches to the mobile device based on the first scheduling priority; and
    in response to the requested item being determined to not have been stored in the caches, assigning a second scheduling priority to the mobile device for facilitating a relay transmission to the mobile device, and sending second instruction data to an access point device of the respective access point devices directing the access point device to transmit the requested item to the mobile device based on the second scheduling priority, wherein the first scheduling priority is higher than the second scheduling priority.

11. The method of claim 10, wherein the controlling comprises altering content of a cache of the caches based on a determined popularity metric of items of the content.

12. The method of claim 10, wherein the respective access point devices comprises a macro access point device.

13. The method of claim 12, further comprising determining a popularity metric associated with the requested item.

14. The method of claim 13, further comprising:
    comparing the popularity metric associated with the requested item with respective popularity metrics of a set of items stored in a cache of the caches; and in response to the comparing, removing at least a portion of the second item from the cache and adding at least a portion of the first item to the cache.

15. The method of claim 10, further comprising:
determining a cache control policy based on history data representing a history of the data representing the statistic of the network.

16. The method of claim 10, further comprising:
selecting a relay transmission policy in response to determining that a cache of the caches does not comprise the requested item, wherein the relay transmission policy comprises data that instructs at least one network device of the network to retrieve request data associated with the requested item via a backhaul connection.

17. A computer-readable storage device storing executable instructions that, in response to execution, cause a system comprising a processor to perform operations, comprising:
evaluating statistical data of a network;
modifying, based on the statistical data, content of caches of respective access point devices of the network;
in response to requested content being determined to have been stored in the caches, assigning a first scheduling priority to a mobile device for facilitating a multiple-input and multiple-output (MIMO) transmission to the mobile device, and sending first instruction information to the respective access point devices directing the respective access point devices to cooperatively transmit the requested content to the mobile device utilizing a common transmission channel of a MIMO transmission mode; and
in response to the requested content being determined to not have been stored in the caches, assigning a first scheduling priority to the mobile device for facilitating a relay transmission to the mobile device, and sending second instruction information to an access point device of the respective access point devices directing the access point device to transmit the requested content to the mobile device.

18. The computer-readable storage device of claim 17, wherein the operations further comprise:
determining respective priorities of a set of the transmissions associated with respective requests for accessing respective items, based on determining whether a cache of the caches comprises the respective items, and wherein a higher priority is associated with a subset of the set of the transmissions that are associated with a portion of the respective items determined to be in the cache relative to another subset of the set of the transmissions that are determined not to be in the cache.

19. The computer-readable storage device of claim 17, wherein the operations further comprise:
altering content of a cache of the caches based on a determined popularity metric of items of the content.

20. The computer-readable storage device of claim 17, wherein the operations further comprise:
based on the statistical data, determining a cache control policy with respect to a video on demand application.

* * * * *